US009231451B2

(12) United States Patent
Atkinson et al.

(10) Patent No.: US 9,231,451 B2
(45) Date of Patent: Jan. 5, 2016

(54) STARTER MOTOR FOR A VEHICLE

(75) Inventors: Travis Reid Atkinson, Knoxfield (AU);
Brian Ray Baxter, Knoxfield (AU)

(73) Assignee: GREATERLINX PTY LTD, Knoxfield,
Victoria (AU)

( * ) Notice: Subject to any disclaimer, the term of this
patent is extended or adjusted under 35
U.S.C. 154(b) by 415 days.

(21) Appl. No.: 13/598,377

(22) Filed: Aug. 29, 2012

(65) Prior Publication Data
US 2014/0062233 A1  Mar. 6, 2014

(51) Int. Cl.
*H02K 11/02* (2006.01)
*H02K 5/14* (2006.01)
*H02K 11/00* (2006.01)

(52) U.S. Cl.
CPC ............ *H02K 5/148* (2013.01); *H02K 11/0089*
(2013.01); *H02K 11/02* (2013.01); *Y10T
29/49169* (2015.01)

(58) Field of Classification Search
CPC .............. H02K 5/148; H02K 11/0026; H02K
11/0089; H02K 5/14; H02K 5/143; H02K
11/02
USPC ................................................. 310/238–239
See application file for complete search history.

(56) References Cited

U.S. PATENT DOCUMENTS

| 4,230,962 | A | * | 10/1980 | Carda | 310/239 |
| 4,926,078 | A | * | 5/1990 | Isozumi et al. | 310/71 |
| 4,954,733 | A | * | 9/1990 | Isozumi | 310/71 |
| 5,087,497 | A | * | 2/1992 | Suzuki et al. | 428/66.6 |
| 5,717,271 | A | * | 2/1998 | Aoki et al. | 310/242 |
| 5,949,173 | A | * | 9/1999 | Wille et al. | 310/220 |
| 2007/0007846 | A1 | | 1/2007 | Niimi | |

OTHER PUBLICATIONS

39MT Heavy Duty Starter Motor, Baxters.com.au, Oct. 18, 2010.
Examination Report for Australian Patent Application No. 2012101349 dated Oct. 16, 2012.

* cited by examiner

*Primary Examiner* — Quyen Leung
*Assistant Examiner* — Eric Johnson
(74) *Attorney, Agent, or Firm* — Pearl Cohen Zedek Latzer Baratz LLP

(57) ABSTRACT

A dual earth starter motor for a vehicle. The starter motor includes a housing, an armature within the housing, a brush plate within the housing arranged to deliver electric current, by means of conductive brushes, to the armature, and two separate earth terminals electrically connected to the brush plate with each terminal extending through a wall of the housing. In a preferred form, the two earth terminals are electrically isolated from the housing, and at least one of the terminals is mechanically and electrically coupled to the brush plate my means of an interference fit between a portion of the terminal and a hole formed in the brush plate. A method of retrofitting a second earth terminal to an existing starter motor is also disclosed.

13 Claims, 5 Drawing Sheets

STARTER MOTOR FOR A VEHICLE

FIELD OF THE INVENTION

The present invention relates generally to motor vehicles and in particular to starter motors for vehicles.

BACKGROUND TO THE INVENTION

Starter motors for heavy vehicles such as large trucks face a particularly onerous task in generating sufficient torque to turn over a large engine. For example, a truck engine of, say, 11 to 13 liter capacity, requires a starter motor producing at least 7 kilowatts of output power. Such a starter motor may draw an in-rush current of somewhere in the region of 1,300 to 2,200 Amps for a short period. This large starting current, occurring within typical vehicle wiring configurations, presents a number of problems which lead to poor starter performance and reliability, and consequential vehicle downtime. Some of the problems include:

A. Poor Starter reliability—Low starter output power and less than expected crank speed, contributing to longer than intended crank durations. This results in progressive damage to the starter motor commutator and associated components due to low voltage/high resistance within the earth connection which is not capable of efficiently conducting in-rush current in applications where more than 4 kW of output power is required.

B. Inadequate/Multiple points of termination for earth/ground connections. The terminal length of the single connection earth termination on existing starter motors cannot facilitate the total number of cables connections, including to the chassis, battery, engine and cabin earthing/ground cables. If the length of the single existing terminal were extended, the excessive leverage would exceed the load carrying capability of the commutator cover and thru bolts of the motor assembly being at a single connection/exit point.

C. Engine component and radiator damage as a result of high stray currents existing exceeding 500 mv peak to peak in the engine block (such that electrolysis erodes material away) causing leakage and/or ingress of fluid/chemical/water to sensors, especially in applications where engine coolant systems are not maintained properly.

D. Also, as noted in item C above, stray currents result in electrolysis, leading to erosion or accelerated corrosion of soft metals in the cabin and chassis, especially where dissimilar metals mate surface to surface.

E. Noise—Radio interference caused by ground loops in communication equipment fitted to a vehicle, as a result of poor earthing at multiple ground points, leading to illusive faults being logged by engine, gear box/transmission and body control modules.

There have been a number of attempts in the past to address one or more of these problems but, to date, none of them have really been successful. Each individual equipment manufacturer has worked to achieve compliance to industry standards and best engineering practices using different methodologies. Many utilise the chassis for earthing/grounding, such that the main chassis rail of the vehicle is utilised for earth, then multiple connections are made to it at various connecting points.

The above problems impact upon the starter motor manufacturer, the engine supplier and the truck builder. Each of these participants has significant commercial and reputational interests at stake. Each party, consciously or otherwise, attempts to shift responsibility for the problem and the cost burden of rectification and re-engineering onto other parties. Consequently, attempts at solving the problems have failed, due to lack of true collaboration and knowledge sharing. The present applicant, through its unique position in the supply chain, has been able to navigate between the parties and bring a holistic solution to the problem based on an understanding of starter motor technology, electrical engineering and application demands.

With the foregoing in mind, the present invention seeks to address one or more of the above problems.

Any discussion of documents, devices, acts or knowledge in this specification is included to explain the context of the invention. It should not be taken as an admission that any of the material formed part of the prior art base or the common general knowledge in the relevant art in Australia or any other country on or before the priority date of the claims herein.

SUMMARY OF THE INVENTION

The present inventors have recognised that many of the above described problems can be solved by providing a convenient facility for a large number of electrical terminations to be provided at the starter motor. This would effectively create a 'star earth' system within the vehicle, thereby reducing stray currents, and at the same time maximise starter motor output power, by minimising resistance in the ground path and thereby maximising the voltage and current delivered to the starter motor.

Accordingly, the invention broadly provides a dual earth starter motor for a vehicle, as well as a method of retrofitting a second earth terminal to an existing starter motor.

In one specific aspect, the present invention provides a starter motor for a vehicle, comprising:

a housing;

an armature within the housing, the armature being rotatable about a longitudinal axis and comprising electrical windings and a commutator for delivering electric current to the windings;

a brush plate for supporting a plurality of conductive brushes and being configured to deliver electric current to the commutator by means of the brushes;

a first earth terminal electrically connected to the brush plate and extending through a wall of the housing to enable an electrical connection from the brush plate to a negative terminal of a battery associated with the vehicle; and a second earth terminal also electrically connected to the brush plate and extending through a wall of the housing to enable a second electrical connection to the brush plate.

The first and second earth terminals together serve to reduce the electrical resistance between the brush plate and the battery and/or enable a greater number of substantially co-terminus earth connections to be made for other equipment located on the vehicle. This increases the power available at the armature of the starter motor to start the engine of the vehicle and reduces the level of stray currents circulating within the vehicle's electrical system.

In a preferred embodiment of the invention, at least one of the two earth terminals comprises an elongate stud passing through the wall of the housing. The stud has an elongate shank and a head. The shank has a base portion adjacent the head and a connection portion away from the head. The connection portion is preferably externally threaded to enable an electrical connector, such as a ring shaped lug, to be secured using a threaded fastener, such as a lock nut. In this embodiment the base portion of the shank is mechanically and electrically coupled to the brush plate by an interference fit between an outer surface of the base portion and an inner surface of a hole through the brush plate.

More preferably, the base portion has a knurled finish which is sized to dig into the internal surface of the hole in the brush plate, thereby creating a plurality of contact points around the circumference of the hole.

In another broad aspect, the present invention provides a starter motor for a vehicle, comprising:

a housing;

an armature within the housing;

a brush plate within the housing arranged to deliver electric current, by means of conductive brushes, to the armature; and two separate earth terminals electrically connected to the brush plate, with each terminal extending through a wall of the housing to enable electrical connections thereto.

Preferably, the two earth terminals are electrically isolated from the housing, and at least one of the terminals is mechanically and electrically coupled to the brush plate my means of an interference fit between a portion of the terminal and a hole formed in the brush plate. Preferably that portion of the terminal has a knurled finish such that a plurality of contact points is formed between the terminal and the brush plate.

In a further aspect, the present invention provides a method of fitting a second earth terminal to a starter motor for a vehicle. The starter motor comprises:

a housing;

an armature within the housing, the armature being rotatable about a longitudinal axis and having a commutator for delivering electric current to the armature;

a brush plate supporting a plurality of conductive brushes and being configured to deliver electric current to the commutator by means of the brushes; and a first earth terminal electrically connected to the brush plate and extending through a wall of the housing to enable an electrical connection from the brush plate to a negative terminal of a battery associated with vehicle.

The method includes the steps of:

preparing a second earth terminal, the second earth terminal comprising an elongate stud having a shank and a head, the shank having a base portion adjacent the head and a connection portion away from the head to enable an electrical connection thereto;

removing the brush plate from the starter motor;

drilling a hole through the brush plate, the hole being sized to create an interference fit with the base portion of the stud;

inserting the stud through the hole in the brush plate and press fitting the base portion into the hole so as to electrically and mechanically couple the stud to the brush plate.

Preferably, the housing of the starter motor includes a commutator cover at one end, with the commutator cover generally overlying the commutator and brush plate. The method may then include the further steps of:

drilling a hole through the commutator cover, said hole being sized to accept an insulator placed over the stud;

reinstalling the commutator cover back in its original position such that the stud of the second earth terminal now projects through the hole in the commutator cover;

placing an insulator over the stud, the insulator being configured to isolate the stud from the commutator cover;

placing a fastener over the stud to secure the insulator in place, and leaving the connection portion of the stud accessible to enable an electrical connection thereto.

The preferred embodiment of the invention facilitates the termination of all existing main earth connections of the vehicle, including those for the cabin, chassis and engine, at two insulated points on the brush plate of the starter motor. This ensures that a very low resistance path exists, for example, no more than 0.001 ohm, for the combined main battery connections when cranking the engine. Without the dual earth feature, achievement of this 0.001 ohm resistance could not be achieved in many vehicle configurations.

Comprises/comprising and grammatical variations thereof when used in this specification are to be taken to specify the presence of stated features, integers, steps or components or groups thereof, but do not preclude the presence or addition of one or more other features, integers, steps, components or groups thereof.

It will be convenient to hereinafter describe the invention with reference to the accompanying drawings which illustrate a preferred embodiment. Other embodiments of the invention are possible and, consequently, the particularity of the accompanying drawings is not to be understood as superseding the generality of the preceding description of the invention.

DETAILED DESCRIPTION OF PREFERRED EMBODIMENT

Figure 1:
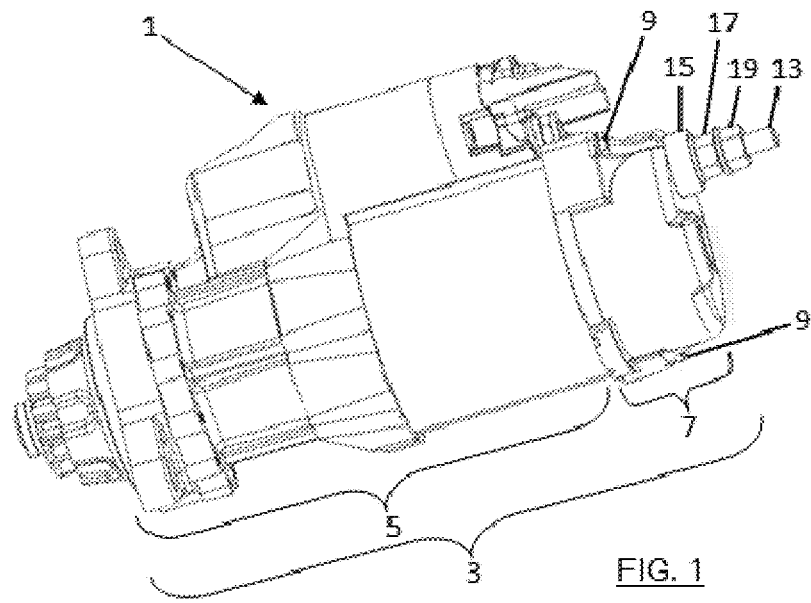
FIG. 1 shows a perspective view of a prior art heavy duty starter motor as might be used in a large truck, and to which the present invention is applicable.

Referring now to the drawings, FIG. 1 shows a prior art starter motor of the type to which the present invention may be applied. The starter motor 1 is a heavy duty insulated starter motor having an output rating of about 6.5 kW (although the invention is useful for smaller starter motors ranging from about 4.0 kW upward). It has a housing 3 comprising a main body portion 5 and a commutator cover 7. Thru bolts 9 serve to secure the commutator cover 7 to the main body 5.

Within the housing 3 is an armature (not shown) which is rotatable about a longitudinal axis of the starter 1. A commutator is provided at the end of the armature, within the armature cover 7, to deliver electric current to windings of the armature.

Figure 3:
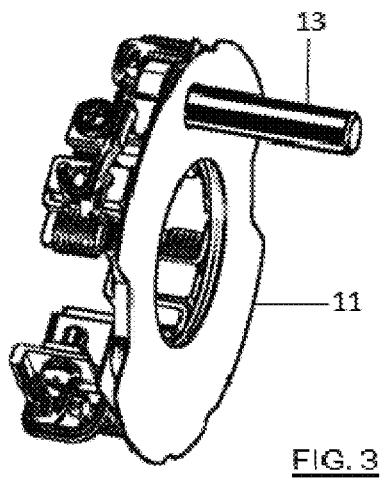
FIG. 3 shows a perspective view of a prior art brush plate as used in the starter motor of FIG. 1.

A brush plate 11, as shown in FIG. 3, supports a plurality of conductive brushes which are arranged within the brush plate to deliver electric current to the commutator. An earth terminal stud 13 is welded to the brush plate 11 so as to form both a mechanical and electrical connection thereto. However, the earth terminal 13 is isolated from the commutator cover 9 (as well as from the housing 3 as a whole) by an insulator 15. This insulator 15 is held in place by a lock nut 17 (see FIG. 1). In use, the earth terminal stud 13 is connected to the negative terminal of a battery of the vehicle by attaching a cable which is terminated, using a suitable ring shaped lug, to the earth terminal stud 13 and then held in place by a second lock nut 19.

Figure 2:
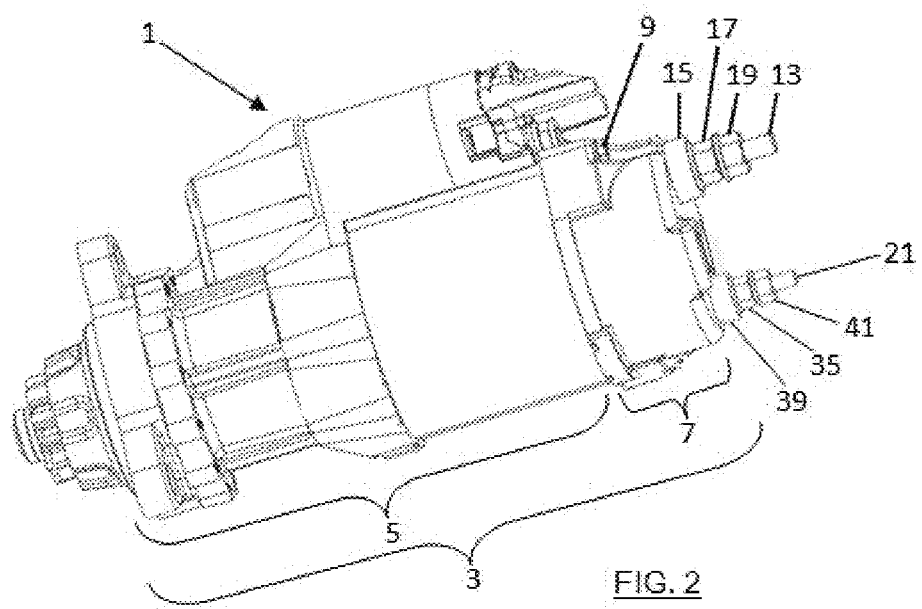
FIG. 2 shows a perspective view of the starter motor shown in FIG. 1 but modified to include a dual earth connection in accordance with a preferred embodiment of the invention.

FIG. 2 shows the insulated starter motor 1 after it has been modified to include a second earth terminal stud 21 in accordance with the present invention. Similar to the first terminal stud 13, the second terminal stud 21 is connected to the brush plate 11 and extends through the end wall of the commutator cover 7.

It will now be convenient to describe the steps involved in a method of modifying an existing starter motor, such as that shown in FIG. 1, to incorporate a second earth terminal stud in accordance with a preferred embodiment of the invention. It should be understood, however, that it is also possible to produce a starter motor having dual earth stud connections from the outset. Such a starter motor could be produced by the original equipment manufacturer.

Figure 4:
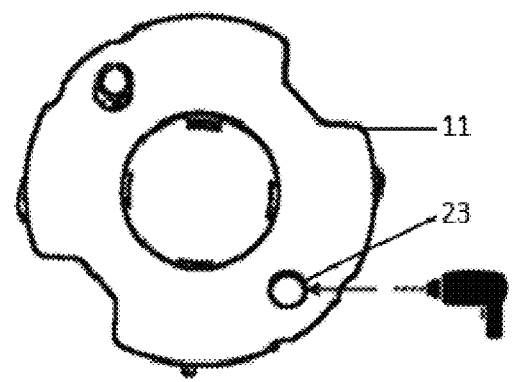
FIG. 4 shows the brush plate of FIG. 3 being drilled to accommodate a second earth terminal stud in accordance with a preferred embodiment of the present invention.

The method of fitting the second earth terminal stud 21 to the existing starter motor 1 includes a number of steps. The existing brush plate 11 is removed from the starter 1 and a hole 23 is drilled in the brush plate as shown in FIG. 4. The hole 23 is sized to receive the second earth terminal stud 21 with an interference fit as described further below.

Figure 5:
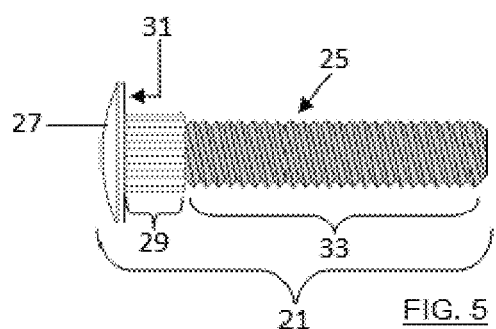
FIG. 5 shows a preferred embodiment of an earth terminal stud as used in the preferred embodiment of the invention.
Figure 10:
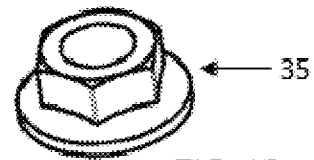
FIG. 10 shows a perspective view of a locking flange nut as used to hold the insulator of FIG. 9 in place on the second earth terminal stud.

FIG. 5 shows a detailed view of the second earth terminal stud 21 having an elongate shank 25 and a head 27. The shank 25 includes a base portion 29 adjacent the underside 31 of the head 27 as well as a connection portion 33 away from the head. The connection portion 33 bears an external thread to enable a locking flange nut 35 (as shown in FIG. 10) to be screwed thereto.

Figure 6:
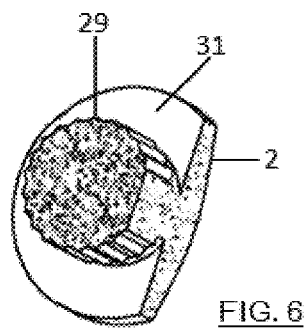
FIG. 6 shows a partial cross-sectional perspective view of the head portion of the earth terminal stud shown in FIG. 5.

The base portion 29 of the stud 21 has a knurled finish which is designed to dig into the internal surface of the hole 23 in the brush plate 11. FIG. 6 shows a partial cross-sectional view of the knurled base portion 29.

In this example, a 21 point knurl having a saw tooth cross-section is used, as shown in FIG. 6. However, any other number of points and any other shape could instead be used. For example, a fluted cross-section having sharp peaks and rounded valleys could be used, or alternatively a rectangular cross-section fluting could be used. In any event, the knurled base portion provides a mechanical attachment of the stud 21 to the brush plate 11 which prevents rotation when the external locking flange nut 35 is installed. More importantly, the knurled finish creates a low resistance 360° radial electrical connection to the brush plate 11. This method of connection (as opposed to welding) minimises the chance of damage to the brush plate 11 and its associated components.

Figure 7:
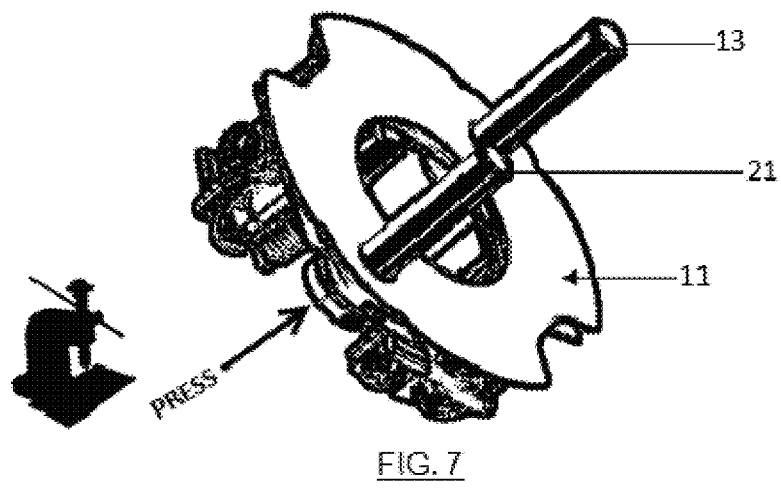
FIG. 7 shows the drilled brush plate of FIG. 4 having the stud of FIG. 5 being press-fitted thereto, so as to produce a dual earth arrangement in accordance with the preferred embodiment of the invention.
Figure 8:
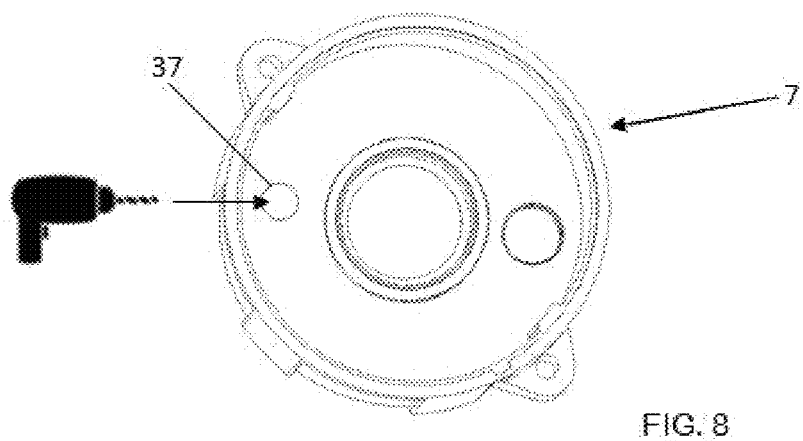
FIG. 8 shows a perspective view of a commutator cover of the starter motor shown in FIG. 1 being drilled to accommodate the second earth terminal stud in accordance with the preferred embodiment of the invention.

Once the hole 23 is drilled in the brush plate 11, the stud 23 is inserted through the hole 23 and then press fitted using a press as shown in FIG. 7 until the underside 31 of the head 27 abuts the inner face of the brush plate 11.

Figure 9:
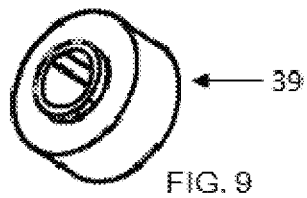
FIG. 9 shows a perspective view of an insulator as used to isolate the second earth terminal stud from the commutator cover.

A hole 37 is then drilled through the end wall of the commutator cover 7 at a location corresponding to the projecting stud 21. The hole 37 is sized to accept an insulator 39 (see FIG. 9) which will subsequently will be placed over the stud 21. The insulator 39 electrically isolates the second earth terminal stud 21 from the commutator cover 7.

Figure 11:
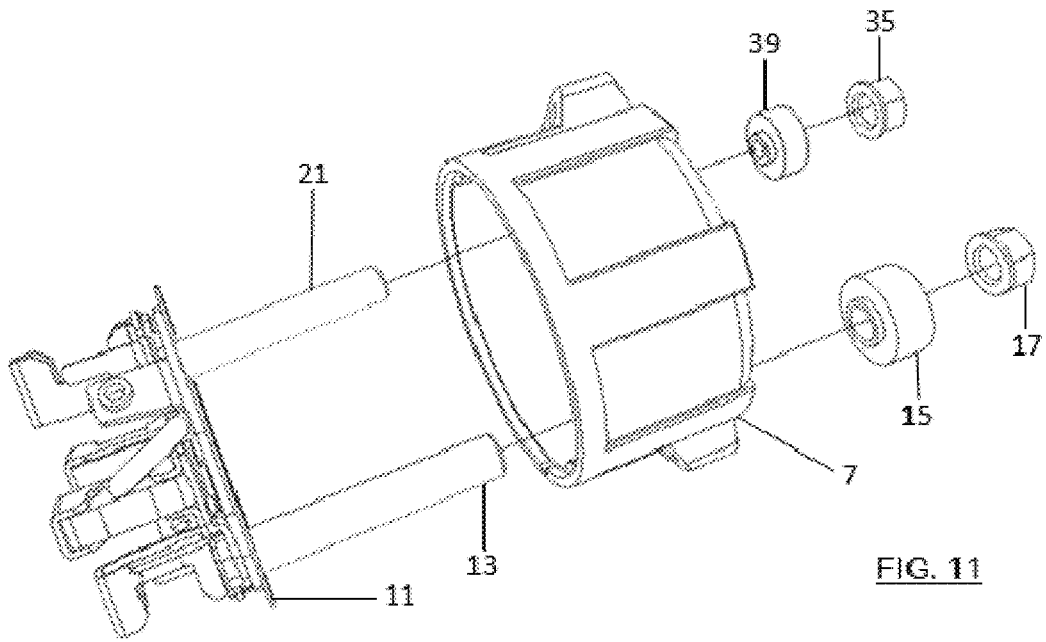
FIG. 11 shows an exploded perspective view of the dual earth stud arrangement produced in accordance with the preferred embodiment of the invention.

Upon reassembly, as depicted in FIG. 11, the locking flange nut 35 is installed on the second earth stud 21 after the insulator 39 has been fitted. Similarly, the original locking flange nut 17 is installed on the first earth terminal stud 13 after the insulator 15 has been fitted.

In the embodiment shown, the second earth terminal stud 21 has an overall length of about 65 mm and a diameter of 10 mm. This provides a usable length, external to the commutator cover 7, of 30 mm. This length is suitable to accommodate ring terminal lugs sized for cables up to 120 mm$^2$.

The reassembled starter motor 1 is shown in FIG. 2. The second insulated terminal stud 21 provides a second battery negative external connection point for a second battery earth cable as well as any additional earth connections from the chassis, engine and cabin. This robust connection point and its location on the starter motor also enables the mechanical load of the cable weight to be equally distributed on the commutator end cover 7 and its thru bolts 9, thereby eliminating the loss of torque to the thru bolts 9 as a result of uneven loading under vibration of the vehicle.

It will be appreciated that the length and diameter of the second earth terminal stud 21 may be scaled as required for a particular model of starter motor, and for any particular requirement for usable length to attach additional cables.

An additional locking nut 41 provides a broad contact patch to the terminal surface for cables which will be installed on to the second earth terminal stud 21.

Figure 12:
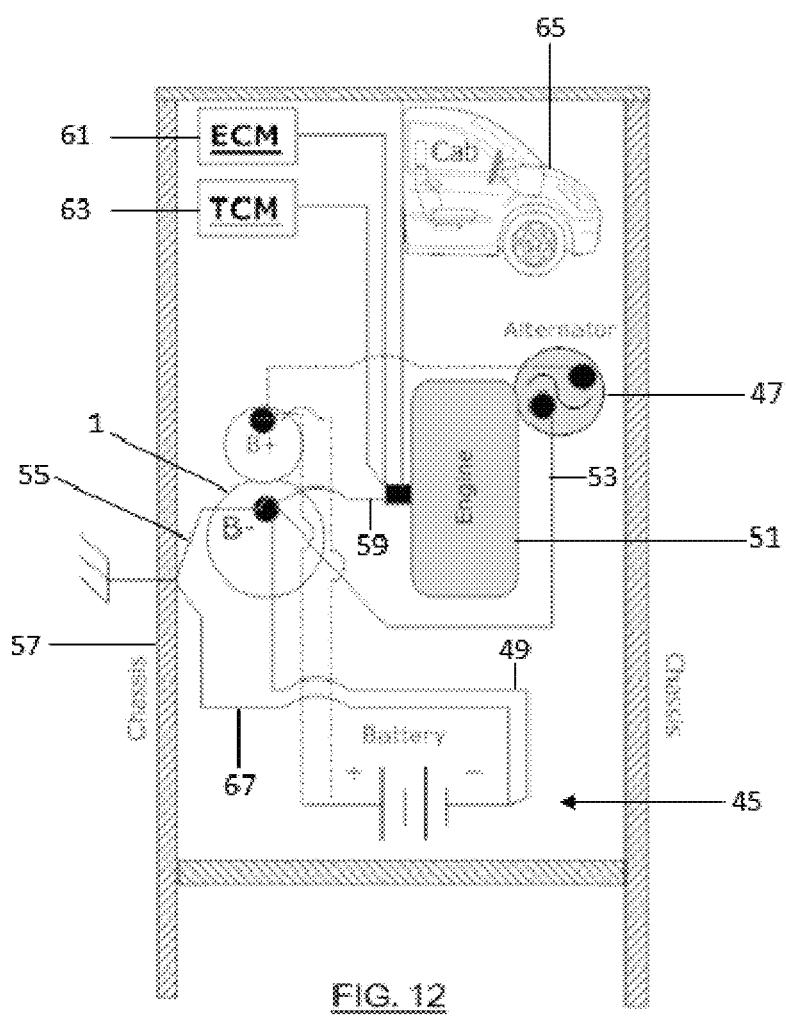
FIG. 12 shows an electrical wiring diagram of a prior art starting circuit within a vehicle.

Referring now to FIG. 12 there is shown an electrical wiring diagram of a conventional starting circuit in a heavy vehicle such as a truck. The circuit includes a starter motor 1, a battery 45 to supply power the starter 1 and an alternator 47 to charge the battery 45. The negative terminal of the battery 45 is connected by a heavy duty cable 49 to the B− terminal of the starter 1, so as to directly supply the high starting current necessary to start the engine 51. The B− terminal of the starter 1 is also connected by another cable 53 to the negative terminal of the alternator 47. In addition, the B− terminal of the starter 1 is connected by a third cable 55 to the chassis 57 of the vehicle, and by a fourth cable 59 to the engine 53. As such, the B− terminal serves as a central reference point for a ground plane of the vehicle created between the negative terminal of the battery 45, the B− terminal of the starter 1 and the negative terminal of the alternator 47.

Since there is not enough physical space on the B− terminal of the starter 1 (because it is of inadequate length), all other major electrical connections to the ground plane of the vehicle are conveniently made at a main ground junction on the engine 53. For example, the Electronic Control Module (ECM) 61, the Transmission Control Module (TCM) 63, and the cabin 65 of the vehicle are all connected to the engine at that junction.

It is also to be noted in FIG. 12 that the alternator 47 is physically and electrically connected to the engine 53, such that two electrical paths exist between the negative terminal of the alternator 47 and the B− terminal of the starter 1. The engine thus forms part of the ground plane of the vehicle.

Since electricity will always try to take the path of least resistance, electrons from the negative terminal of the alternator 47 will flow through the engine 51 and cable 59 in preference to flowing through the higher resistance cable 53. The engine itself thus creates a high current path between the alternator 47 and the starter 1, and thereby creates a ground loop wherein slight differences in potential, especially during periods of high current (when the engine is being started), cause stray currents to flow in the loop. This causes fluctuations and electrical noise in the DC voltage, which can impact upon the electronics of the vehicle including the ECM and TCM.

It can also be seen in FIG. 12 that a second ground loop is formed by a cable 67 between the negative terminal of the battery 45 and the ground connection on the chassis 57, the alternative path being via cable 49, the B− terminal of the starter 1 and cable 55. This once again leads to stray currents and electrical noise in the DC voltage.

Figure 13:
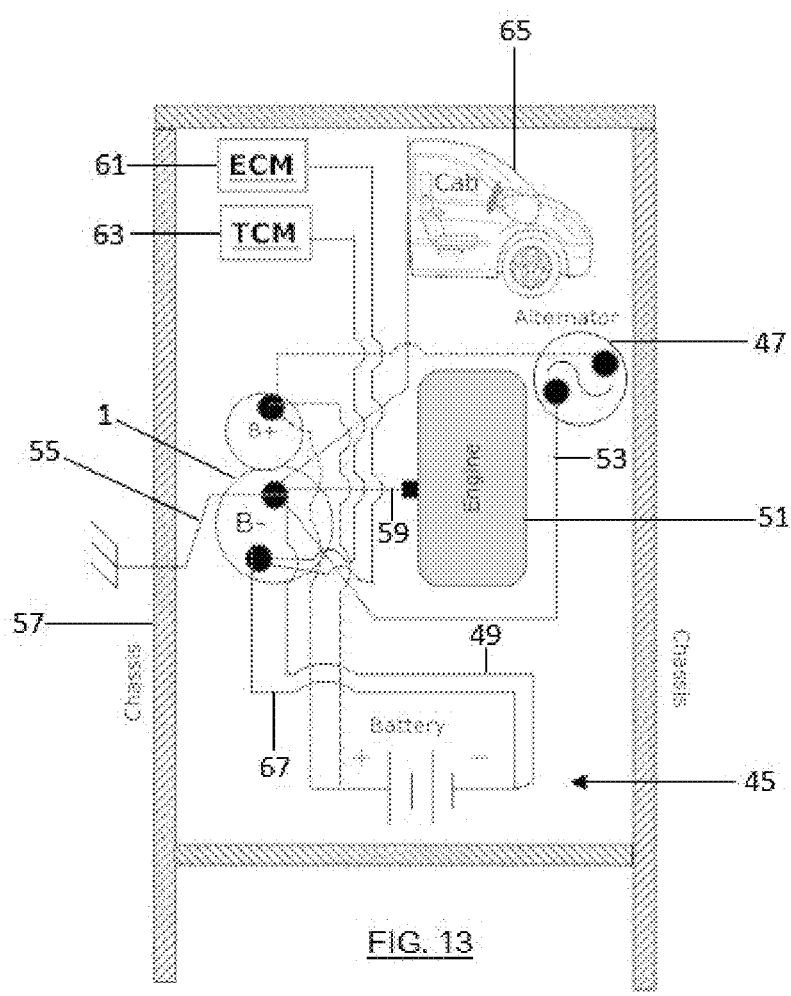
FIG. 13 shows an electrical wiring diagram of a modified starting circuit in accordance with a preferred embodiment of the invention.

Turning now to FIG. 13, there is shown an electrical wiring diagram of a modified starting circuit which is enabled by the present invention. This modified circuit is made possible by the dual earth starter motor produced in accordance with the invention. Similar reference numerals are used in FIG. 13 to identify similar components appearing in FIG. 12.

In this instance, the modified starter 1 has a second B− terminal and the alternator 47 is physically and electrically separated from the engine 51. Other than for a single cable 59 connecting the engine 51 to the starter 1, the engine 51 is isolated from the ground plane of the vehicle. The ground plane is now formed between the negative terminal of the alternator 47, the B− terminal of the starter 1 and the negative terminal of the battery 45. The ground loop has been eliminated.

Similarly, the second ground loop has been eliminated by connecting the cable 67 to the second B− terminal of the starter 1 rather than to the chassis 57. There are now two parallel high current capacity cables connecting the two B− terminals of the starter 1 directly to the battery 45. This feature alone reduces the resistance and hence increases the power available to the starter 1 during engine starting.

What the modified starter 1 has allowed is a star point connection for all earth cables at the two B− terminals. There is one designated earth connection point, thereby eliminating ground loops and stray currents. The engine is not within the ground plane of the vehicle and is isolated from any stray currents which could cause electrolysis and lead to corrosion of metal parts. Reliability and service life of the whole vehicle, not just the starter motor, is thereby improved.

The reliability of the vehicle's electrical system is also improved because clean, noise free power is now delivered to the electronic control modules and other equipment.

It will be appreciated that the present invention provides a dual earth arrangement which can easily be integrated into existing starter motors, and into existing vehicles. The main component, at least in the preferred form of the invention, is the second earth terminal stud having a knurled finish. The method used to attach the stud to the brush plate ensures a complete radial contact patch, which provides a very low resistance electrical connection and also acts as a mechanical connection. No welding or soldering is required. The press fit connection mitigates the risk of damage to the brush plate and its associated components as a result of thermal degradation, both during the installation process and over time when in use on a vehicle.

The method of installing the second earth terminal stud may also be used on starter motors from any manufacturer and does not require any special tools or design changes to the original brush plate, or to the existing electrical wiring harnessing of the vehicle. Only the routing and attachment point of the harness/cables is changed on the vehicle and this can be done quickly in a factory environment.

A primary advantage of the dual earth arrangement is the reduction of resistance in the main battery negative line to the brush plate, and hence to the commutator within the starter. The output capability of the starter is not compromised by the usual lack of adequate voltage/current supply or high resistance due to routing and multiple connections. The dual earth ensures an efficient conversion of energy, thereby enabling the starter to reach its maximum speed quickly and allowing the engine to self-sustain (a short crank duration). This extends the starter's life by reducing component degradation over time as a result of heat at, before and after commutation within the starter.

The invention claimed is:

1. A starter motor for a vehicle, comprising:
   a housing;
   an armature within the housing, the armature being rotatable about a longitudinal axis and comprising electrical windings and a commutator for delivering electric current to the windings;
   a brush plate for supporting a plurality of conductive brushes and being configured to deliver electric current to the commutator by means of the brushes;
   a first earth terminal comprising an elongate stud which is electrically connected to the brush plate and has a threaded connection portion extending through an external wall of the housing, the threaded connection portion being configured to enable an electrical cable terminated with a ring shaped lug to be secured thereto by means of a threaded fastener placed over the lug, said electrical cable thereby enabling an electrical connection from the brush plate directly to a negative terminal of a battery associated with the vehicle; and
   a second earth terminal comprising a second elongate stud which is also electrically connected to the brush plate and also has a threaded connection portion extending through the external wall of the housing, the threaded connection portion of the second stud being configured to enable a second electrical cable terminated with a second ring shaped lug to be secured thereto by means of a second threaded fastener placed over the second lug, said second electrical cable thereby enabling a second electrical connection from the brush plate directly to the negative terminal of the battery,
   wherein the first and second earth terminal studs are electrically isolated from the housing by insulators located between each of the studs and the external wall of the housing.

2. The starter motor of claim 1 wherein at least one of the earth terminal studs comprises:
   an elongate shank and a head,
   the shank having a base portion adjacent the head and a connection portion away from the head, and
   the base portion being mechanically and electrically coupled to the brush plate by an interference fit between an outer surface of the base portion and an inner surface of a hole through the brush plate.

3. The starter motor of claim 2 wherein the base portion has a knurled finish which is sized to dig into the internal surface of the hole in the brush plate, thereby creating a plurality of contact points around the circumference of the hole.

4. The starter motor of claim 3 wherein the knurled finish includes a saw tooth formation with a plurality of teeth which dig into the internal surface of the hole.

5. The starter motor of claim 2 wherein the head of the stud abuts a face of the brush plate to increase the surface contact between the stud and the brush plate.

6. The starter motor of claim 2 wherein the base portion of the shank has a larger diameter than a diameter of the connection portion.

7. The starter motor of claim 1,
wherein the housing includes a commutator cover at one end thereof, with the commutator cover generally overlying the commutator and brush plate,
and wherein the first and second earth terminal studs project from the commutator cover in a direction generally parallel to the longitudinal axis to enable dual electrical connections thereto.

8. The starter motor of claim 1 wherein each earth terminal stud passes through the external wall of the housing in a direction parallel to the longitudinal axis.

9. The starter motor of claim 8 wherein each earth terminal stud has an elongate shank and a head,
each shank having a base portion adjacent the head and a connection portion away from the head, and
each base portion being mechanically and electrically coupled to the brush plate by an interference fit between an outer surface of the base portion and an inner surface of a hole through the brush plate.

10. The starter motor of claim 8 wherein each earth terminal stud is mechanically and electrically coupled to the brush plate by being welded thereto.

11. A starter motor for a vehicle, comprising:
a housing;
an armature within the housing;
a brush plate within the housing arranged to deliver electric current, by means of conductive brushes, to the armature; and
two separate earth terminals, each comprising an elongate stud which is electrically connected to the brush plate and has a threaded connection portion extending through an external wall of the housing, each threaded connection portion being configured to enable a respective electrical cable terminated with a ring shaped lug to be secured thereto by means of a threaded fastener placed over the respective lug, the two electrical cables thereby enabling two separate electrical connections directly to a negative terminal of a battery associated with the vehicle,
wherein the two earth terminal studs are electrically isolated from the housing by insulators located between each stud and the external wall of the housing.

12. The starter motor of claim 11 wherein at least one of the earth terminal studs is mechanically and electrically coupled to the brush plate by means of an interference fit between a portion of the stud and a hole formed in the brush plate.

13. The starter motor of claim 12 wherein said portion of the stud has a knurled finish such that a plurality of contact points are formed between the terminal and the brush plate.

* * * * *